United States Patent
Porto et al.

(10) Patent No.: US 10,161,512 B2
(45) Date of Patent: Dec. 25, 2018

(54) SYSTEM AND METHOD FOR TORQUE CONVERTER CLUTCH PRESSURE CIRCUIT FILLING AND CAPACITY DETECTION

(71) Applicant: GM GLOBAL TECHNOLOGY OPERATIONS LLC, Detroit, MI (US)

(72) Inventors: Brian M Porto, Novi, MI (US); Jason Jousma, Holly, MI (US); Patrick A Lewis, Howell, MI (US); Jason M France, Dexter, MI (US)

( * ) Notice: Subject to any disclaimer, the term of this patent is extended or adjusted under 35 U.S.C. 154(b) by 288 days.

(21) Appl. No.: 15/245,909

(22) Filed: Aug. 24, 2016

(65) Prior Publication Data
US 2018/0058576 A1 Mar. 1, 2018

(51) Int. Cl.
F16H 45/02 (2006.01)
F16H 61/14 (2006.01)
F16H 39/42 (2006.01)

(52) U.S. Cl.
CPC ............. F16H 61/14 (2013.01); F16H 39/42 (2013.01); F16H 45/02 (2013.01)

(58) Field of Classification Search
CPC .................................. F16H 45/02; F16H 61/14
See application file for complete search history.

(56) References Cited

U.S. PATENT DOCUMENTS

| | | | |
|---|---|---|---|
| 4,051,932 A * | 10/1977 | Arai | F16H 47/08 192/3.3 |
| 4,582,185 A * | 4/1986 | Grimes | F16H 45/02 192/3.3 |
| 5,484,354 A * | 1/1996 | Vukovich | F16H 61/14 192/3.3 |
| 6,066,072 A * | 5/2000 | Adachi | F16H 61/143 477/176 |
| 9,080,619 B2 | 7/2015 | Li et al. | |
| 9,188,222 B2 | 11/2015 | Monajemi et al. | |
| 9,222,531 B2 | 12/2015 | Biggs et al. | |
| 9,341,199 B2 | 5/2016 | Benson et al. | |
| 9,341,261 B2 | 5/2016 | Gunderson | |
| 9,365,204 B2 | 6/2016 | Whitney et al. | |
| 2016/0230822 A1* | 8/2016 | Endo | F16H 61/702 |
| 2017/0009866 A1* | 1/2017 | Herrmann | F16H 61/0206 |
| 2017/0204968 A1* | 7/2017 | Honma | F16H 59/18 |

* cited by examiner

*Primary Examiner* — Tisha D Lewis (57) ABSTRACT

A transmission includes a torque converter with an impeller, a turbine, a torque converter clutch, a hydraulic torque converter clutch control circuit and a controller that commands a first pressure into the hydraulic torque converter clutch control circuit during a transition period between a torque converter clutch OFF mode to a torque converter clutch ON mode and prior to the torque converter clutch reaching capacity and a second pressure into the hydraulic torque converter clutch control circuit after the torque converter clutch reaches capacity.

15 Claims, 5 Drawing Sheets

SYSTEM AND METHOD FOR TORQUE CONVERTER CLUTCH PRESSURE CIRCUIT FILLING AND CAPACITY DETECTION

FIELD

The present disclosure relates to a system and method for torque converter clutch pressure circuit filling and capacity detection.

INTRODUCTION

This introduction is for the purpose of generally presenting the context of the disclosure. Work of the presently named inventors, to the extent it is described in this introduction, as well as aspects of the description that may not otherwise qualify as prior art at the time of filing, are neither expressly nor impliedly admitted as prior art against the present disclosure.

A torque converter is typically placed between a prime mover, such as, for example, an engine or electric motor and an automatic transmission that transmits torque between them, using an impeller and a turbine device operating with a viscous fluid. A torque converter clutch typically includes a pressurized fluid-actuated friction device engageable to mechanically couple the impeller, receiving input from the prime mover, and the turbine, having an output to the transmission. In a typical application, the clutch can be fully released, actuated in a slip mode, and fully engaged, i.e., locked. When the clutch is fully released, there is unrestrained slippage between the impeller and the turbine, and torque is transmitted between them based upon the flow of hydraulic fluid between the impeller and the turbine. When the clutch is actuated in the slip mode, torque is transmitted between the impeller and the turbine through the flow of hydraulic fluid and controlling pressure of hydraulic fluid to the actuated clutch, and typically there is a difference in rotational speeds between the impeller and the turbine, i.e., a relative speed. When the clutch is fully released, or actuated in the slip mode, torque perturbations between the engine and the transmission resulting from either engine operation or driveline dynamics are absorbed in the fluid of the torque converter.

When the clutch is fully engaged, the rotational speeds of the impeller and the turbine are the same, and torque is transmitted between the impeller and the turbine through the actuated torque converter clutch. When the torque converter clutch is fully engaged, a range of engine torque perturbations or torsionals are passed directly through the clutch to the vehicle drivetrain, producing pulsations when not properly damped. Some torsionals may be absorbed in a torsional damper which may be an element of the torque converter. The action of completely locking the torque converter clutch is often restricted to specified vehicle operating conditions to minimize the effects on the noise, vibration and harshness. As a result, potential efficiency gains afforded by fully engaging the torque converter clutch are only realized over a portion of the range of vehicle operations.

In some instances, a clutch control mode switches from OFF to ON, where engagement of the torque converter clutch is regulated.

SUMMARY

When the torque converter clutch is OFF (or "released") the fluid within the torque converter clutch control circuit is allowed to drain down. Upon receipt of a command to transition from an OFF mode to an ON mode (i.e. slip mode or lock mode), the torque converter clutch control circuit must then be filled before any pressure is applied to the clutch. This fill time results in a delay between the commanded ON mode and actual engagement of the clutch. In the meantime, the control system may have transitioned into a torque converter clutch (TCC) slip control mode (or other "ON" mode) which commands the hydraulic pressure into the control circuit in an attempt to cause a differential between the engine speed and turbine speed to follow a slip profile. The TCC slip control monitors the difference in input speed (impeller speed or engine speed) and a desired or target speed profile. Since the clutch does not immediately engage, the input speed does not immediately follow the target speed profile which results in an accumulated error in the control algorithm. This error may result in the control algorithm driving the clutch control pressure higher than necessary to follow the desired slip profile which may result in the clutch "crashing" causing inconsistent or even lack of control over the clutch engagement such that a desired profile is not followed.

In contrast, an exemplary embodiment accounts for this fill delay by commanding a fill pulse to be commanded to the hydraulic flow through the torque converter clutch control circuit when transitioning from an OFF mode and prior to transitioning into another control mode (such as a TCC slip control mode) until capacity of the clutch is detected. This ensures that the torque converter clutch control circuit is completely full and prepared for fine control by a subsequently entered control mode.

In one exemplary aspect of the present invention, a transmission includes a torque converter with an impeller, a turbine, a torque converter clutch, a hydraulic torque converter clutch control circuit and a controller that commands a first pressure into the hydraulic torque converter clutch control circuit during a transition period between a torque converter clutch OFF mode to a torque converter clutch ON mode and prior to the torque converter clutch reaching capacity and a second pressure into the hydraulic torque converter clutch control circuit after the torque converter clutch reaches capacity.

In another aspect, the transmission controller determines when the torque converter clutch control circuit reaches capacity.

In another aspect, the first pressure is higher than the second pressure.

In another aspect, the first pressure is higher than the second pressure by a fill pulse pressure that expedites the transition of the torque converter clutch to capacity.

In another aspect, the second pressure comprises a feed forward modeled pressure control.

In another aspect, the controller determines when the torque converter reaches capacity based upon an engine speed.

In another aspect, the controller applies a finite impulse response filter to the engine speed to determine when the torque converter clutch reaches capacity.

In another aspect, the controller averages the filtered engine speed to determine when the torque converter clutch reaches capacity.

In another aspect, the controller further determines the difference between the averaged filtered engine speed and the filtered engine speed to determine when the torque converter clutch reaches capacity.

In another aspect, the controller further compares the difference to a threshold to determine when the torque converter clutch reaches capacity.

In another aspect, a method for controlling a transmission torque converter clutch includes determining a transition between a torque converter clutch OFF mode and an ON mode, commanding a first pressure into a hydraulic torque converter clutch control circuit during the transition between the OFF mode and the ON mode, detecting when the torque converter clutch reaches capacity, and commanding a second pressure into the hydraulic torque converter clutch control circuit after detecting that the torque converter clutch reaches capacity.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

Figure 1:
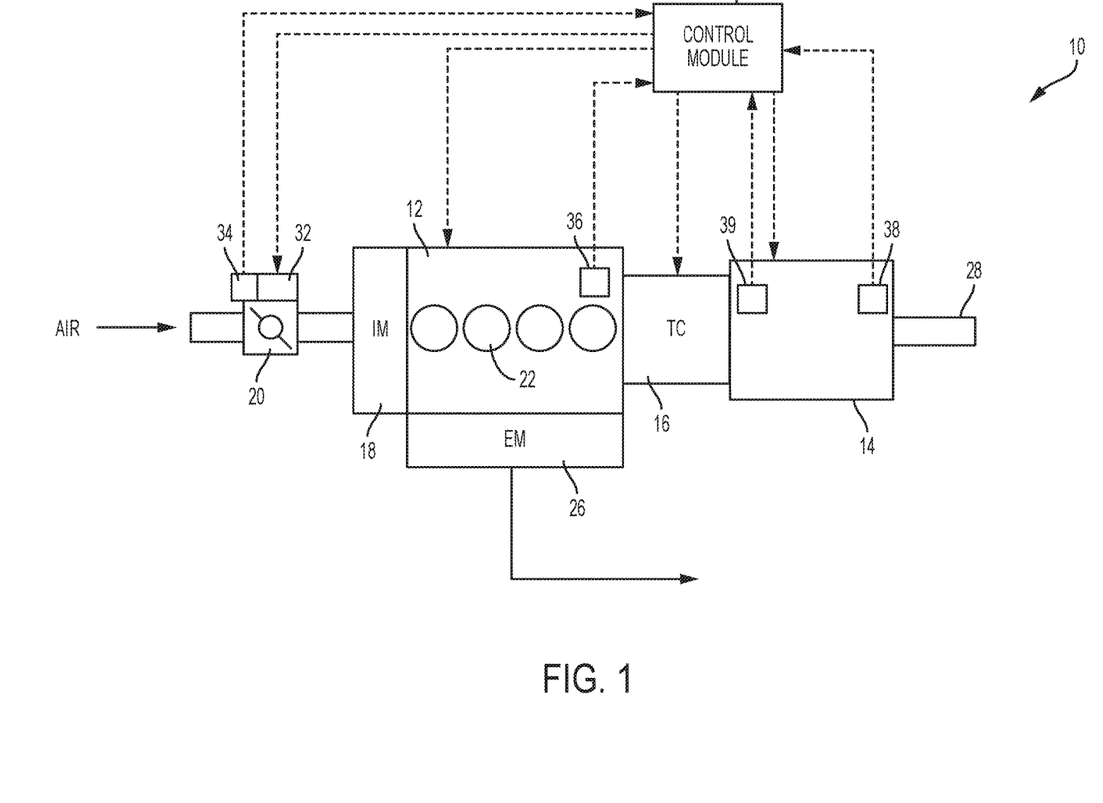
FIG. 1 is a functional block diagram of an exemplary vehicle powertrain.

FIG. 1 illustrates an exemplary powertrain 10 that includes an engine 12 that drives transmission 14 through a coupling device 16. More specifically, air is drawn into an intake manifold 18 of the engine 12 through a throttle 20. The air is mixed with fuel and the air/fuel mixture is combusted within cylinders 22 to reciprocally drive pistons (not shown) within the cylinders 22. The pistons drive a crankshaft 24 (see FIG. 2) to provide torque. Exhaust generated by the combustion process is exhausted from the engine through an exhaust manifold 26.

The drive torque is transferred through the torque converter 16 to drive the transmission 14. The transmission 14 multiplies the drive torque by a desired gear ratio to provide a modified drive torque. The modified drive torque is transferred to a vehicle driveline (not shown) by a transmission output shaft 28. The transmission 14 can include a manual transmission, an automatic transmission, an automated manual transmission, a continuously variable transmission, or the like without limitation.

A control module 30 regulates operation of the powertrain based on vehicle operating parameters. More specifically, the control module 30 regulates an effective throttle area via a throttle actuator 32. A throttle position sensor 34 generates a throttle position signal and the control module 30 determines a requested engine torque and adjusts the throttle position and other engine operating parameters to achieve the requested engine torque.

The control module 30 also regulates operation of the transmission 14 based on vehicle operating parameters. More specifically, a crankshaft position sensor 36 generates a crankshaft position signal, which is used to determine an actual engine speed. A transmission output shaft speed sensor 38 generates a transmission output shaft speed (TOSS) signal, which is used to determine a vehicle speed and a transmission input shaft speed sensor 39 generates a transmission input shaft speed (TISS) signal. The control module 30 adjusts a gear ratio of the transmission 14 based on the throttle position and vehicle speed.

Figure 2:
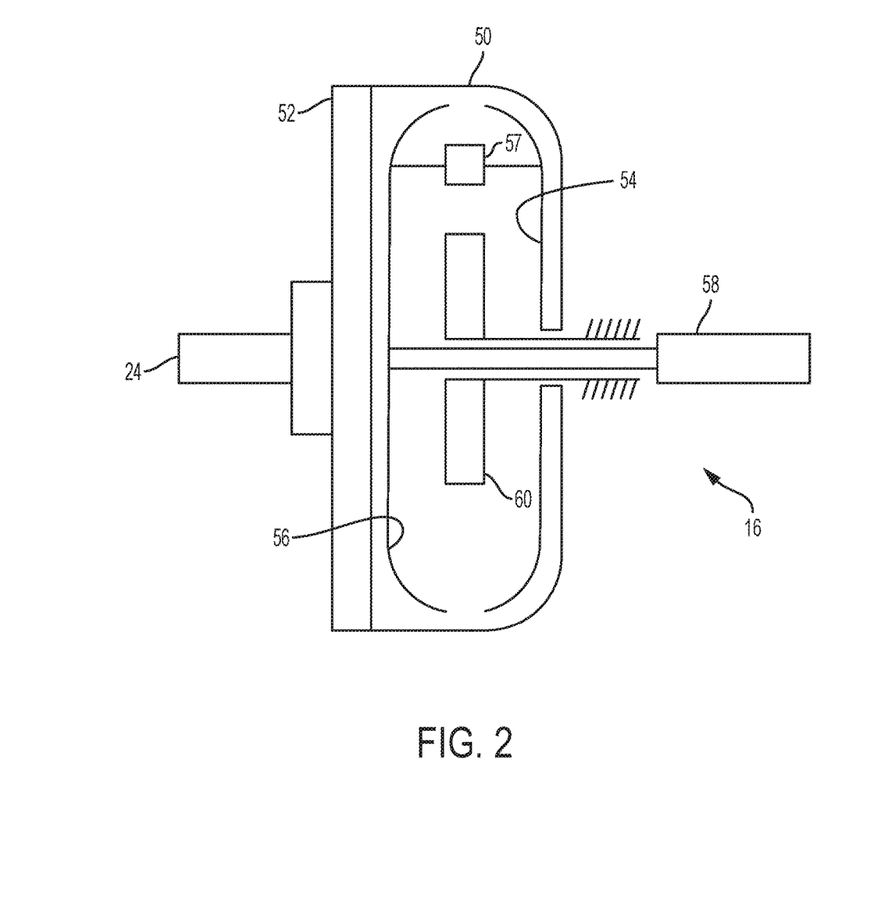
FIG. 2 is a schematic illustration of an exemplary torque converter for an exemplary vehicle powertrain.

Referring now to FIG. 2, the coupling device 16 is illustrated as a torque converter that provides a fluid coupling between the engine 12 and the transmission 14. The torque converter 16 includes a housing 50 that is fixed for rotation with the crankshaft 24 via a flywheel 52. An impeller 54 is fixed for rotation with the housing 50 and a turbine 56 is fixed for rotation with a transmission input shaft 58. A stator 60 is also provided and is fixed from rotation. The interior of the torque converter 16 is filled with a viscous fluid. Rotation of the impeller 54 induces corresponding motion of the viscous fluid, which is directed towards the turbine 56. The torque converter 16 includes a torque converter clutch (TCC) 57, which is selectively engaged to provide a direct drive between the crankshaft 24 and the input shaft 58.

As the crankshaft 24 rotates at an idle speed the impeller 54 rotates at the same idle speed. Idle speed, however, is normally insufficient to overcome braking forces that inhibit rotation of the turbine 56 from rotating. As the braking forces are reduced and/or engine speed increases, the impeller 54 drives the viscous fluid into the turbine 56 and the turbine 56 is induced to rotate. As a result, drive torque is transferred through the transmission 14 to propel the vehicle. Upon achieving a point where there is little or no speed difference between the turbine 56 and the impeller 54, the TCC 57 is engaged to provide a more direct drive between the engine 12 and the transmission 14. Under this condition, the rotational speed of the turbine 56 is very close to or equal to the engine speed. The speed differential between the speed of the turbine 56 and the engine 12 is known as "slip". The amount of the TCC slip is controlled according to a TCC slip profile by an electronic clutch control (ECC) in the control module 30 during a transition from TCC OFF to a TCC ON mode. The ECC performs a closed-loop slip control around the slip profile. In this manner, the TCC slip is rapidly regulated according to driving conditions, and vehicle drivability is enhanced.

Figure 3:
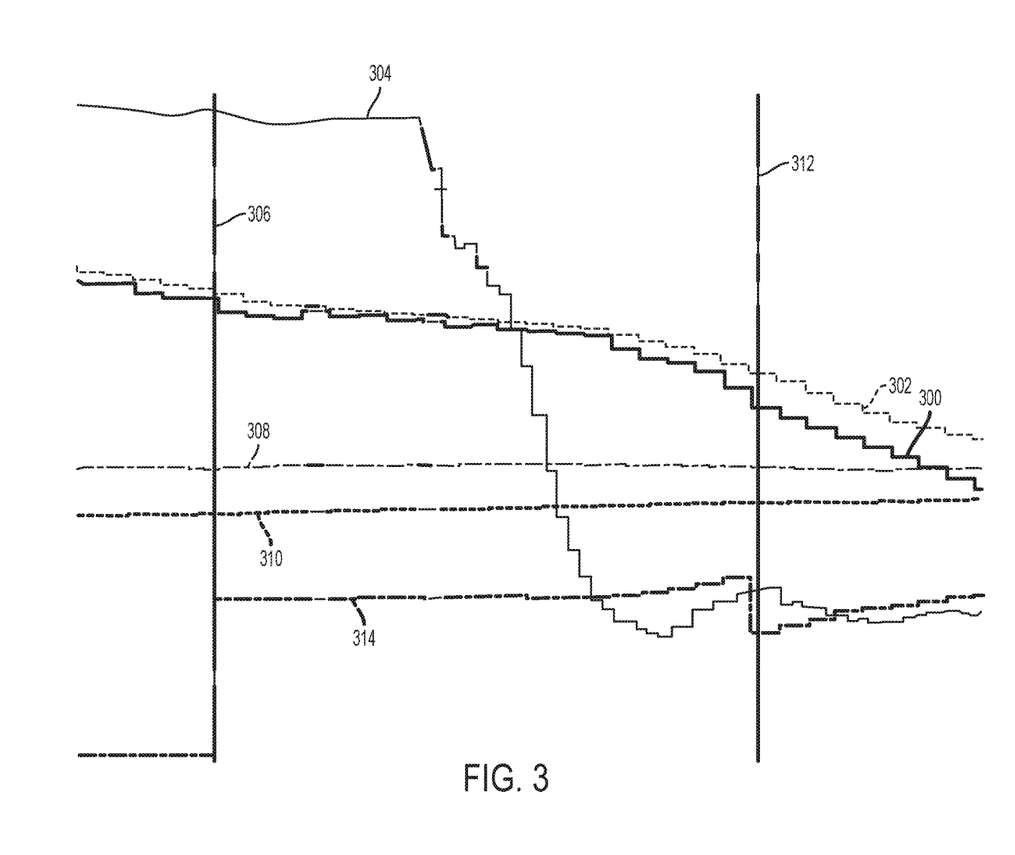
FIG. 3 is a diagram illustrating exemplary signals indicative of a torque converter clutch control system in accordance with the present invention.

FIG. 3 is a diagram illustrating exemplary signals indicative of a torque converter clutch control system in accordance with the present invention. A desired torque converter clutch slip profile is illustrated as signal line 300 and the actual torque converter clutch slip profile achieved with the present invention is illustrated as signal line 302. As can be clearly seen, the actual torque clutch slip profile 302 closely follows the desired torque converter clutch slip profile 300. FIG. 3 further illustrates the engine speed signal 308 and the turbine speed signal 310.

The actual torque converter clutch pressure is illustrated in FIG. 3 as signal line 304. During this transition between a TCC OFF mode (before time line 306) to a TCC ON mode (after time line 312), the position of a valve within the hydraulic control circuit moves from a "release" mode, where the hydraulic pressure is applied to hold the clutch in a release position, to an "apply" mode, where the hydraulic pressure is being applied to the torque converter clutch such that the clutch is applied. As can be clearly seen, from the time at which the TCC ON mode is commanded at time 306 there is a delay between when the hydraulic pressure drops from the high pressure in the "release" mode until the TCC mode valve moves to re-route the hydraulic fluid into the "apply" circuit of the torque converter clutch, which is seen as a drop in pressure as the hydraulic control circuit for the "apply" mode fills with hydraulic fluid and achieves the ability (i.e. the capacity) to apply the torque converter clutch. After the TCC achieves the capacity to be effective at 312, the control system determines that capacity has been achieved and hands control off to the TCC ON mode.

The pressure commanded to the TCC hydraulic circuit is illustrated by signal 314. The commanded pressure is determined according to equation (1) below:

$$P\text{command} = \{T\text{clutch} \times Gx + P\text{offset} + P\text{adapt}\} + P\text{pulse} \quad (1)$$

Where: $P_{command}$ is the total pressure commanded to the TCC hydraulic circuit; $T_{clutch}$ is the net torque at the torque converter clutch; $G_x$ is the torque converter clutch characteristic linearization gain; $P_{offset}$ is the torque converter clutch characteristic linearization offset; $P_{adapt}$ is the vehicle-specific learned adaptable pressure offset; and $P_{pulse}$ is the fill pulse pressure. The portion of equation (1) within the brackets is a basic feed forward control construct which is understood by those of ordinary skill in the art and also may be used when the TCC is in ON and/or COAST modes. In contrast, $P_{pulse}$ is unique to this invention. $P_{pulse}$ is applied on top of or added to the basic feed forward control construct to provide an additional pressure or "pulse" which expedites the transition of the TCC hydraulic control circuit between an OFF mode to an ON mode. $P_{pulse}$ is a value that may be experimentally derived or "calibrated" and stored in a table or memory for access and application into equation (1) above during the transition. Exemplary factors which may influence the value stored as $P_{pulse}$ include temperature, engine torque, turbine speed, speed ratio, or the like without limitation.

Figure 4:
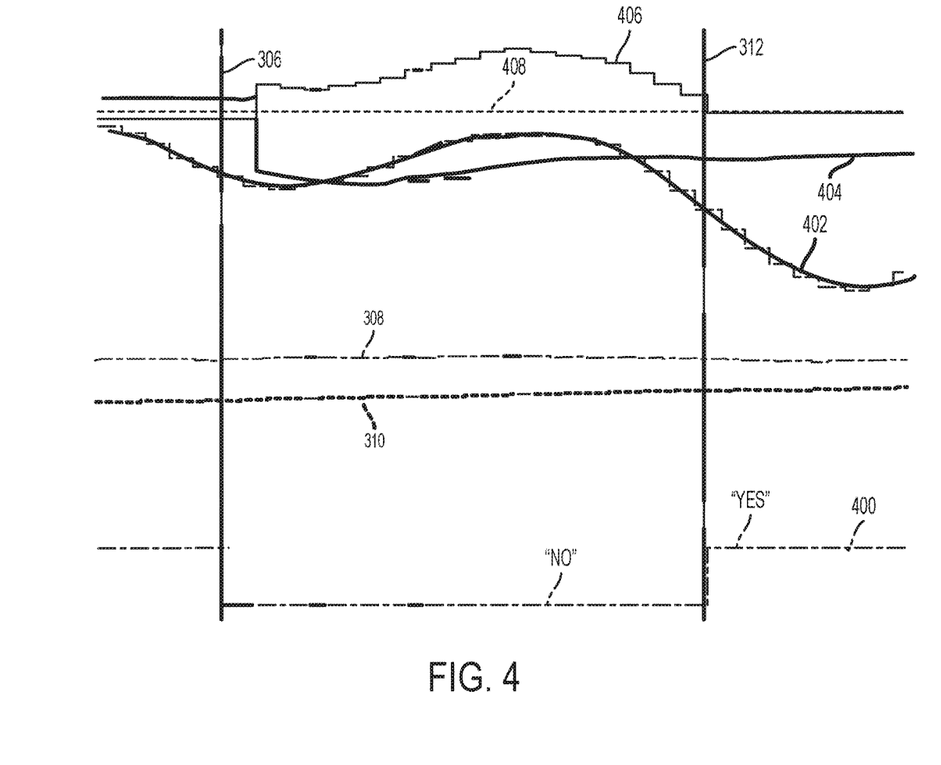
FIG. 4 is another diagram illustrating additional exemplary signals indicative of a torque converter clutch control system in accordance with the present invention.

FIG. 4 is another diagram illustrating additional exemplary signals indicative of a torque converter clutch control system in accordance with the present invention. In particular, FIG. 4 illustrates signals that demonstrate how an exemplary embodiment may determine when the torque converter clutch has reached capacity and, thus, is capable of being effective to control engine speed 308 relative to turbine speed 310. This exemplary embodiment relies upon a finite impulse response filter of the engine speed 308 to determine when the torque converter clutch has reached capacity. A capacity state machine is represented at 400, which is a flag which is set to "NO" when the TCC is commanded to ON at time 306. Once this exemplary embodiment determines that the TCC has achieved capacity, then the flag of the state machine is set to "YES."

One exemplary method for determining when a clutch has achieved capacity is to use a finite impulse response filter. Other means of determining when a clutch has achieved capacity may be used without limiting the present invention. Any method for detecting capacity to determine when to transition from the application of a fill pulse to a subsequent mode may be used without limitation. For example, if the actual pressure of the torque converter clutch is sensed, then that signal may be used to determine that the torque converter clutch has reached capacity. Currently, most automotive transmissions do not include such a pressure sensor, thus, other means are used to determine when capacity is reached, such as, for example, the engine speed.

An exemplary finite impulse response filter is shown in equation (2) below:

$$Y[n] = \Sigma_{i=0}^{N} b_i \cdot x[n-i]$$

Where: $Y[n]$ is the filtered engine acceleration; $b_i$ is a coefficient of the filter at the $i^{th}$ instance; N is the number of instances or samples; n is the current sample or instance; and x is the engine speed. The number of instances or samples is selected based upon the observed effect of the filter on the output from the filter. Too few samples generally result in too high of a signal-to-noise ratio and too many samples will slow the speed of the calculation below an acceptable level. Thus, the number of samples needs to be "tuned" or "optimized" until the desired result is achieved for the specific signal upon which the filter is applied.

In this exemplary embodiment, the capacity detection method looks for actual inflection of engine speed, when you fill the clutch such that you have capacity, the TCC applies another load on the engine which affects the speed of the engine. When the TCC is applied this speed starts to change and, thus, the acceleration of the engine changes. The moment when that acceleration of the engine speed changes provides an indicator that capacity of the TCC has been reached and, thus, is detected.

The engine speed inherently undergoes significant changes which results in enormous accelerations. These large acceleration changes are inherent in the slider-crank mechanism of an internal combustion engine. These large accelerations in the engine speed signal constitute noise that make it difficult to differentiate between accelerations experienced by slider-crank combustion engines from that acceleration which results from a torque converter clutch reaching capacity and having an effect on the engine speed. In other words, the signal-to-noise ratio of the engine speed is quite high. The application of a finite impulse response (FIR) filter significantly reduces the signal-to-noise ratio and makes it now possible to determine when the torque converter clutch reaches capacity merely by analyzing the engine speed signal. A finite impulse filter essentially is a moving average filter that weights the individual samples and those inputs which are large receive a small weight and those that are small receive a large weight and the overall effect is to output a signal that is much smoother than the input signal (i.e. raw engine speed). The more samples which are used the better the output signal, but more signals also result in a longer calculation time. The smaller number of samples the faster the calculation, but the output is essentially a loop-to-loop acceleration which may not be smooth enough to minimize the signal-to-noise ratio such that the output is useful. The size of the buffer for the FIR filter also has an effect. Thus, those of ordinary skill in the art understand and appreciate that the FIR filter requires optimization or tuning to determine an appropriate or useful capacity (buffer size) and number of samples. For example, one may choose to have a filter with a buffer capacity of fifteen samples and which uses eight of those data points or samples as part of the calculation. Once the buffer size and number of samples is selected, tools exists which are known to those of ordinary skill, into which buffer size and sample number may be input and which output appropriate and useable weights (or coefficients, b in equation (2) above) to be applied to each sample within the filter.

Referring now to FIG. 4 and equation (2) above, the instantaneous engine speed signal 308 is input to the FIR filter which outputs a filtered acceleration signal 402. A moving average for that filtered acceleration signal 402 is also calculated and illustrated as acceleration average line 404. As can be seen from FIG. 4, the filtered acceleration signal 402 and the acceleration average signal 404 generally follow each other until the torque converter clutch starts to have an effect upon the engine speed, which results in a separation between these two signal 402 and 404. Thus, an increasing distance between these two signals may indicate the TCC reaching capacity. Accordingly, the difference between the filtered acceleration signal 402 and the acceleration average signal 404 is then determined and represented as an acceleration delta signal 406. The amplitude of that acceleration delta signal 406 is compared to a threshold 408 and when the delta signal 406 crosses the threshold 408 the system and method determines that torque converter clutch capacity has been achieved, the capacity flag 400 is set to "YES" and the TCC control system then transitions to a subsequent ON mode.

The value of the threshold 408 against which the acceleration delta signal 406 is compared may be optimized, selected, or tuned according to the judgment of those of ordinary skill in the art of transmission design and/or calibration. For example, with reference back to FIG. 3, the torque converter clutch pressure 304 drops from an initially high value until the hydraulic control circuit for the "apply" side of the torque converter clutch fills and reaches capacity and that pressure starts to level off and increase gradually. The point at which the pressure 304 starts to level off after the drop may indicate that the torque converter clutch has reached capacity and a threshold may then be selected which corresponds to the acceleration delta signal 406 at that instant. However, since torque converter clutch control pressure may not be sensed in an automotive transmission outside of a test environment, to be sure that capacity has been reached when looking at the engine speed which is commonly sensed, a threshold may be selected which occurs only after the filtered acceleration signal 402 drops below the acceleration average signal 404 and thus, the acceleration delta signal 406 has reached a level which provides confidence that capacity has indeed been reached.

Figure 5:
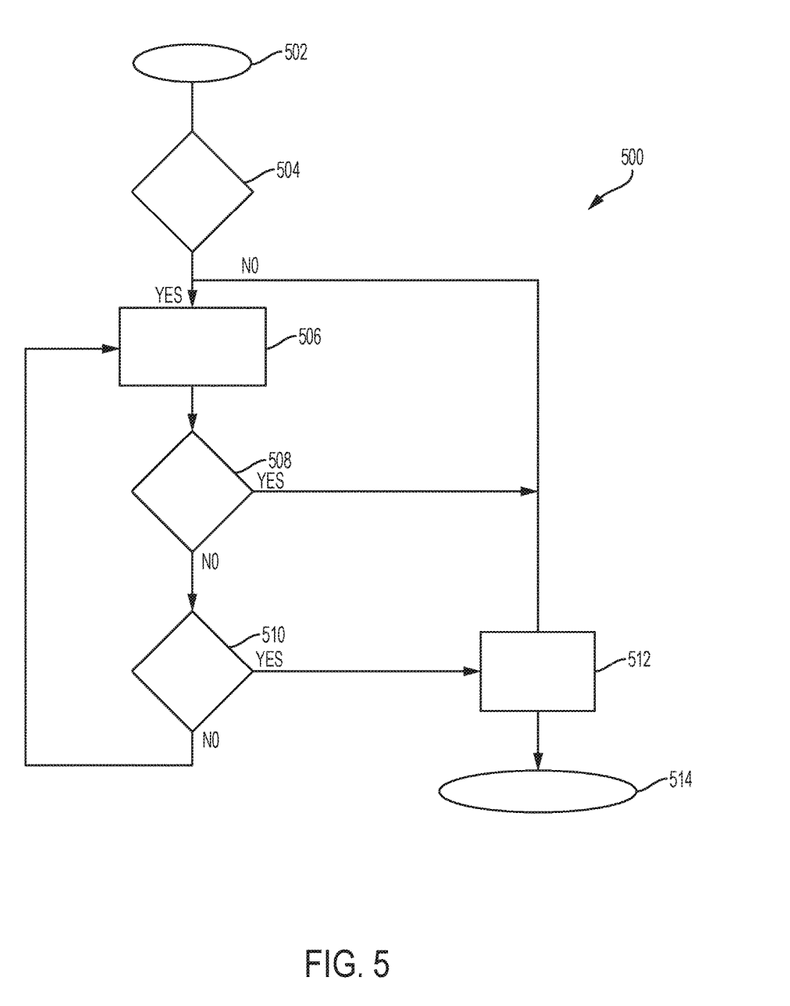
FIG. 5 is a flowchart of an exemplary method in accordance with the present invention.

FIG. 5. is a flowchart of a method 500 in accordance with an exemplary embodiment of the invention. The method starts at step 502 and proceeds to step 504. In step 504, the method determines whether to apply a fill pulse delay. Typically, this may be accomplished with reference to a shift pattern, a torque converter clutch pattern, or other relevant factors as may be known to those of ordinary skill in the art. If the method determines that the fill pulse delay is not to be applied, then the method jumps to step 512. Alternatively, the method proceeds to step 506 where the system applies the fill pulse to the pressure command provided to the hydraulic control circuit of the torque converter clutch as well described above. The method then proceeds to step 508 where the system determines whether the torque converter clutch has reached capacity. If the system determines that the torque converter clutch has reached capacity, then the method proceeds to step 512. Alternatively, if the system determines that the torque converter clutch has not reached capacity, then the method proceeds to step 510. In step 510, the system determines whether a timer has expired. The duration of the timer may be selected by those of ordinary skill in the art based upon several known factors. If the system determines that the timer has expired, then the method proceeds to step 512. Alternatively, if the system determines that the timer has not expired, then the method returns to step 506. In step 512, the control system enters into torque converter clutch ON mode or other appropriate control mode. The method then ends at step 514.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A transmission with a torque converter clutch, comprising:
    a torque converter including an impeller, a turbine, a torque converter clutch, and a hydraulic torque converter clutch control circuit; and
    a controller that commands a first pressure into the hydraulic torque converter clutch control circuit during a transition period between a torque converter clutch OFF mode to a torque converter clutch ON mode and prior to the torque converter clutch reaching capacity and a second pressure into the hydraulic torque converter clutch control circuit after the torque converter clutch reaches capacity, wherein the controller determines when the torque converter clutch reaches capacity based upon an engine speed, and wherein the controller applies a finite impulse response filter to the engine speed to determine when the torque converter clutch reaches capacity.
2. The transmission of claim 1, wherein the controller further determines when the torque converter clutch control circuit reaches capacity.
3. The transmission of claim 1, wherein the first pressure is higher than the second pressure.
4. The transmission of claim 3, wherein the first pressure is higher than the second pressure by a fill pulse pressure that expedites the transition of the torque converter clutch to capacity.
5. The transmission of claim 1, wherein the second pressure comprises a feed forward modeled pressure control.
6. The transmission of claim 1, wherein the controller averages the filtered engine speed to determine when the torque converter clutch reaches capacity.
7. The transmission of claim 6, wherein the controller further determines the difference between the averaged filtered engine speed and the filtered engine speed to determine when the torque converter clutch reaches capacity.
8. The transmission of claim 7, wherein the controller further compares the difference to a threshold to determine when the torque converter clutch reaches capacity.
9. A method for a controlling a transmission torque converter clutch, comprising:
    determining a transition between a torque converter clutch OFF mode and an ON mode;
    commanding a first pressure into a hydraulic torque converter clutch control circuit during the transition between the OFF mode and the ON mode;
    detecting when the torque converter clutch reaches capacity; and
    commanding a second pressure into the hydraulic torque converter clutch control circuit after detecting that the torque converter clutch reaches capacity, wherein detecting when the torque converter clutch reaches capacity comprises analyzing an engine speed, and wherein analyzing the engine speed comprises applying a finite impulse response filter to the engine speed.
10. The method of claim 9, wherein the first pressure is higher than the second pressure.

11. The method of claim 10, wherein the first pressure is higher than the second pressure by a fill pulse pressure that expedites the transition of the torque converter clutch to capacity.

12. The method of claim 9, wherein the second pressure comprises a feed forward modeled pressure control.

13. The method of claim 9, wherein analyzing the engine speed further comprises averaging the filtered engine speed.

14. The method of claim 13, wherein analyzing the engine speed further comprises determining the difference between the averaged filtered engine speed and the filtered engine speed.

15. The method of claim 14, wherein analyzing the engine speed further comprises comparing the difference to a threshold.

* * * * *